（12）United States Patent
Farina

(10) Patent No.: US 8,484,834 B2
(45) Date of Patent: Jul. 16, 2013

(54) PLANT FOR THE ELECTROCHEMICAL FORMATION OF LEAD-ACID BATTERIES

(75) Inventor: Pietro Farina, Villafranca (IT)

(73) Assignee: Sovema S.p.A., Villafranca (VR) (IT)

( * ) Notice: Subject to any disclaimer, the term of this patent is extended or adjusted under 35 U.S.C. 154(b) by 624 days.

(21) Appl. No.: 12/645,730

(22) Filed: Dec. 23, 2009

(65) Prior Publication Data

US 2010/0205801 A1 Aug. 19, 2010

(30) Foreign Application Priority Data

Dec. 23, 2008 (IT) .............................. PD2008A0380

(51) Int. Cl.
*H01M 2/36* (2006.01)
*H01M 10/12* (2006.01)
*B65B 31/00* (2006.01)
*B67C 3/00* (2006.01)

(52) U.S. Cl.
USPC .................. 29/730; 137/260; 141/59; 429/74

(58) Field of Classification Search
None
See application file for complete search history.

(56) References Cited

U.S. PATENT DOCUMENTS 8,286,676 B2 * 10/2012 Ianniello ....................... 141/198
2007/0111043 A1 5/2007 Stocchiero

FOREIGN PATENT DOCUMENTS

| CN | 2938426 Y | 8/2007 |
| SE | 441403 B | 9/1985 |
| WO | 2004102691 A2 | 11/2004 |

* cited by examiner

*Primary Examiner* — Jonathan Crepeau
(74) *Attorney, Agent, or Firm* — Browdy and Neimark, PLLC

(57) ABSTRACT

Improved plant for the electrochemical formation of lead-acid batteries, which comprises a circuit for circulating the electrolytic solution for the purpose of controlling its temperature and electrolytic concentration, provided with supply means for conveying into the cells via a first distribution header a first flow of electrolytic solution at a constant piezometric pressure and return means for removing under a vacuum by means of a suction header the first flow of electrolytic solution from the cells. A cap, which comprises an inlet pipe connected via a first connecting line to the first distribution header and an outlet pipe, is removably mounted in a sealed manner on each cell. Each cap also comprises at least one ventilation pipe which connects the internal environment of the cell, present underneath the lid, to the external environment which is at atmospheric pressure, so as to dilute the formation of inflammable gases inside said cell.

12 Claims, 5 Drawing Sheets

PLANT FOR THE ELECTROCHEMICAL FORMATION OF LEAD-ACID BATTERIES

FIELD OF APPLICATION

The present invention relates to an improved plant for the electrochemical formation of lead-acid batteries, according to the preamble of the independent main claim.

The plant in question is intended to be used in the industrial sector for the production of lead-acid batteries and, in particular, for the electrochemical formation of large-size batteries such as stationary power-supply batteries or industrial batteries for driving electrical vehicles.

BACKGROUND ART

The industrial processes for the production of lead batteries conventionally envisage a step for assembly of the individual voltaic cells which make up the batteries, with the provision, inside plastic containers, of lead plates or grids containing the active material (lead, lead sulfate, etc) which is involved in the electronic chemical reactions. The positive and negative plates are connected electrically together to form the electrodes, are immersed in a concentrated aqueous solution of acid, referred to below as electrolytic solution, generally consisting of sulfuric acid (electrolyte), and are electrically divided by partitions for isolating the electrodes from each other, while allowing free circulation of the electrolyte.

The plates are therefore those elements where, during discharging and charging of the batteries, electrochemical reactions occur for transformation of chemical energy into electrical energy and vice versa. During discharging the anode is subject to an oxidizing reaction and the cathode to a reducing reaction which enable an EMF to be generated at the electrodes.

At the time of their production, the plates are inert or inactive and are made active by means of an electrochemical formation process for transforming the oxide and the lead sulfate into spongy metallic lead and into lead dioxide which form the active material of the respectively negative and positive plates.

This operation for electrical formation of the plates requires the supplying of direct current to the electrodes of the cells forming the batteries so that they are charged up to the predefined voltage and current values and are ready for commercial distribution and use.

During formation of the plates there is an increase in the temperature of the electrodes and the electrolytic solution both owing to the endothermic chemical reactions which take place during charging and as a result of the ohmic effect due to the flow of the direct current.

A problem which exists in the industrial battery-manufacturing sector consists in the need to accelerate the formation process without, however, increasing the charging current to excessively high values which could damage the active material.

For this purpose, various formation methods and plants have been developed in order to control the temperature during the process for electrochemical formation of the plates, with the aim of preventing damage to the active material which lines them. In order to achieve this, the temperature must preferably be kept below 60° C.

In accordance with a known plant for the electrical formation of lead-acid batteries, in order to cool the electrolytic solution during charging, said solution is extracted from the battery cells and is circulated inside an external circuit where its temperature characteristics and electrolytic concentration are controlled.

It has also been attempted to solve the problem of heating by circulating inside the battery cells an electrolytic solution which is diluted or has a low electrolytic density so as to produce a small amount of heat during the main battery formation stage and an electrolytic solution with a higher density for final charging of the batteries with an electrolyte having a final concentration substantially equal to the concentration for operation of the battery.

For this purpose, the external circuit for circulating the electrolytic solution comprises two circuits, each of which has, connected along it, a storage tank for the respective electrolytic solution, a heat exchanger and means for adjusting the density of the solution by means of the controlled supply of water or electrolyte.

The sulfuric acid concentration must remain substantially constant during charging. However, the chemical reactions produce a variation in the concentration of the electrolyte. In particular, during the formation stage there is an increase in the concentration of the electrolytic solution and consequently the density adjusting means introduce preset amounts of solvent liquid (usually water).

Normally the electrolytic solution is introduced with force inside each cell so that the electrolyte already present is forced out under pressure.

For this purpose, as is known, each voltaic element (or cell), referred to below in short as "cell", is provided with a closing cap inserted inside an opening provided on top of the lid of its plastic container.

Each cap usually comprises an inlet pipe, through which the electrolytic solution is introduced into the cell, and an outlet pipe, through which the electrolytic solution is extracted from the cell. The inlet and outlet pipes in the cap of each cell are respectively connected by means of first and second connecting lines to an electrolytic solution distribution header, which receives the solution from a delivery line, and to an electrolytic solution receiving header, which conveys the solution to a return line. This circulation circuit, via the pipes in the cap, ensures that there is a continuous flow of electrolyte passing through the individual cells.

In greater detail, the end of the inlet pipe inside the cell extends down to a height lower than that which is reached by the inner end of the outlet pipe.

The inlet pipe has a diameter with dimensions specifically designed to supply the cell with a predetermined flow usually determined by the piezometric height at which the distribution header is situated. Heating of the cells and the pressure acting on them in order to circulate the electrolytic solution may result in deformation of the cell containers.

Moreover, during the formation stage, the electrochemical reactions which occur inside the cells may generate inflammable gases and in particular hydrogen. The latter may accumulate in the top part of the cell underneath its lid, without being able to escape through the outlet pipe. Moreover, the hydrogen atmosphere underneath the lid may be enriched also with oxygen which has formed during separation of the water in particular during the final charging stage when the plates are less likely to absorb the sulfates.

Consequently, dangerous explosions may occur in the event of short-circuits between plates of different polarity.

In order to overcome these drawbacks, it is known, for example, from EP-A-1627438 to extract the electrolytic solution from the cells by providing a vacuum using suitable fans in the electrolytic solution return line and providing an opening in the cap suction connection pipes in order to dilute the quantity of hydrogen, or inflammable gases, which are conveyed along the return line. In greater detail, in accordance with the teaching expressed in this patent on Page 11, lines 3 to 6, the fan expelled by the fan contains a quantity of hydrogen below the limit which triggers explosion thereof in air, because it is diluted in each of the pipes connected to the return pipe, said pipes each having an opening which allows the entry of sufficient volumes of air.

This solution, however, in practice has proved to be not without drawbacks. In fact, most of the accidents due to explosion of the hydrogen/oxygen combustion mixture occur in the proximity of the battery and not along the circuit for drawing off the electrolytic solution.

As is known, in fact, the risks of explosion are mostly due to small discharges which occur not so much when the electrolytic solution is drawn off and conveyed, but more so inside the battery and, even more frequently, on the outside thereof.

As is known, the plates with different polarity are alternated with each other inside the battery and are connected to two ordinary electrodes which are welded to the lead sleeves fixed to the lid. A voltage differential of 2 volts exists between the plates of different polarity and may give rise to discharges, for example due to faults or holes in the dividing partitions, causing triggering of the explosive mixture.

Before charging, the electrodes of the various cells are connected to electrical connectors so that the batteries are arranged in series and connected to the power supply source. The batteries are often damp with the sulfuric acid solution which, attacking the lead of the electrodes, forms lead sulfate which is an insulating agent. When the operator moves the connectors in order to re-establish electrical conduction, electrical discharges may occur between the connector and the electrode outside the battery with consequent triggering of the explosive combustion mixture.

In the sector for the manufacture of industrial batteries, in particular large-size batteries, such as in particular static batteries, filling of the cell container with the electrolyte is a fairly lengthy process because of the large quantity of electrolytic solution which must be introduced into the containers before they are filled, so as to allow the electrolytic solution to start circulating inside the external circuit and to cool as a result.

Operationally speaking, in order to perform electrolytic formation, the batteries to be charged are arranged on pallets and are then electrically connected to an electric power source (mains power supply) and then the caps are hydraulically connected to both the delivery and return connecting lines so as to then start the plant charging process.

The inlet pipe in each cap is, however, specifically designed for the cell operating condition so that initially a lot of time is required to fill the container of each cell with the electrolytic solution before the latter reaches the outlet pipe of the cap and can start to circulate inside the external cooling circuit.

In addition to the drawback of the long time required for electrochemical formation of the plates (or charging of the batteries) owing to the time lost with filling the cells, the chemical reactions which occur at the start of filling may cause excessive heating of the electrolytic solution, which risks damaging the active material.

For these reasons, the large-size batteries are usually filled manually before being charged, by inserting the free ends of pipes connected to a storage tank containing the electrolytic solution, into the openings in the caps of the cells, before closing them with the caps.

This procedure is awkward and lengthy to perform and requires personnel to carry out filling of all the cell containers.

Moreover, in the event of a malfunction of the suction system intended to provide a vacuum in the return line, the electrolytic solution flows out from the end of the compensation pipe into the air and is dispersed, soiling the premises and the plant.

DISCLOSURE OF THE INVENTION

The problem forming the basis of the present invention is therefore that of overcoming the drawbacks of the known plants by providing an improved plant for the electrochemical formation of lead-acid batteries, which is able to perform the electrochemical formation of the battery cells in a substantially safe manner without the risk of explosion.

A further object of the present invention is to provide an improved plant for the electrochemical formation of lead-acid batteries, which is able to shorten the time required for electrochemical formation of the cells even if they are large in size.

A further object of the present invention is to provide an improved plant for the electrochemical formation of lead-acid batteries, which is constructionally inexpensive to produce and operationally entirely reliable.

Another object of the present invention is to provide an improved plant for the electrochemical formation of lead-acid batteries, which is completely automatic.

With the present according to the present invention it is possible to achieve the advantage of filling quickly large-size cells, in particular static battery cells, without the need for manual operations, in a manner which is entirely safe for the operators and without the possibility of undesirable losses of electrolytic solution.

BRIEF DESCRIPTION OF THE DRAWINGS

The technical features of the invention, in accordance with the above-mentioned objects, may be clearly determined from the contents of the accompanying claims and the advantages thereof will emerge more clearly from the detailed description which follows, with reference to the accompanying drawings which illustrate a purely exemplary and non-limiting embodiment thereof, where:

DETAILED DESCRIPTION OF A PREFERRED EXAMPLE OF EMBODIMENT

Figure 1:
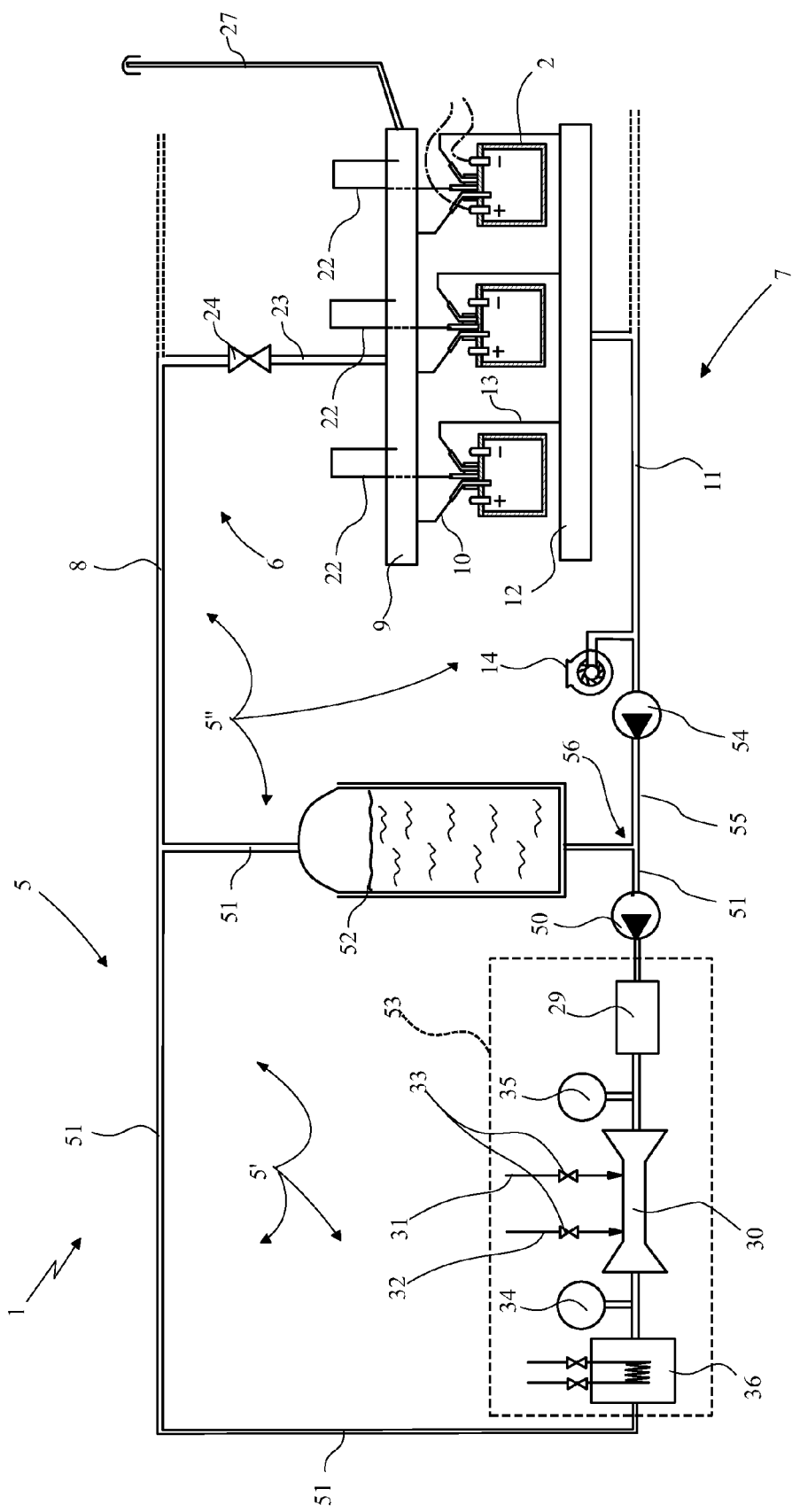
FIG. 1 shows a diagram of a first example of a plant for the electrochemical formation of lead-acid batteries, according to the present invention.

With reference to the accompanying drawings, 1 denotes in its entirety an example of a plant for the electrochemical formation of lead-acid batteries, according to the present invention.

In accordance with the accompanying figures, a plurality of elements or cells 2, in particular of large-size static batteries, is positioned on a bench or on a pallet (not shown) for easy transportation. Each cell 2 comprises, in an entirely conventional manner, a rigid, box-shaped, plastic container 2' which is closed at the top by a lid 2" which has, fixed projecting externally therefrom, a positive electrode 3 and a negative electrode 4. Each of these elements also extends inside the container so as to be connected to the plates (not shown) of corresponding polarity. The electrodes 3, 4 are connected for the electrochemical formation process to respective conducting bars of opposing polarity which are in turn connected to an electric power source which supplies them with direct current in accordance with predetermined charging programs.

The plant comprises a circuit 5 having, circulating within it, an electrolytic solution which, in accordance with the known art, may consist, in an entirely conventional manner, mainly of sulfuric acid (electrolyte) in an aqueous solution. The circuit 5 is configured, as will be described more fully below, so as to reach all the cells 2 which are to undergo the electrochemical formation process of the plant 1, causing to flow through them an electrolytic solution which is suitably cooled and controlled with regard to its electrolytic concentration.

In accordance with the embodiment of the plant 1 shown in the accompanying figures, the circuit 5 for circulating the electrolytic solution comprises supply means 6 for supplying the battery cells 2 with a first flow of electrolytic solution at a controlled piezometric pressure and return means 7 for drawing off under a vacuum the aforementioned first flow of electrolytic solution from the cells 2 so as to generate a continuous circulation of solution inside them.

As will be explained below, the aforementioned flow which supplies the cells 2 is also able to keep the concentration of electrolyte substantially constant.

In greater detail, the supply means 6 comprise a delivery line 8 connected to at least one first distribution header 9 for conveying the first flow of electrolytic solution into the cells 2 of the batteries.

The first distribution header 9 extends horizontally in tubular form and preferably a normal plant 1 will have various first distribution headers 9 arranged in succession with their longitudinal axes aligned in a direction parallel to the direction of longitudinal extension of the plant 2 (and in particular to that of the delivery line 8), so as to supply various charging stations positioned along the same plant 1 and designed to charge battery cells which for example have electrical characteristics differing from each other.

The first distribution header 9 is supplied by the delivery line 8 via a first connecting pipe 23 along which a first valve 24 is connected.

In turn, the return means 7 comprise a receiving line 11 connected to at least one suction header 12 which is under a vacuum so as to draw off from the cells 2 the first flow of electrolytic solution which was introduced into the cells 2 by the distribution header 9.

For this purpose, the suction header 12 extends horizontally in tubular form, parallel to the first distribution header 9 so as to draw off from each cell 2 the aforementioned first flow of electrolytic solution. The vacuum is achieved by means of an electric fan 14 which advantageously is connected to the receiving line 11 and is able to expel the air into the atmosphere after subjecting it to filtering operations. The receiving line may have, connected along it, an intermediate tank (not shown in the accompanying figures) for separating the liquid phase from the air phase and, in this case, the electric fan 14 may be mounted on top of the tank in order to draw off the gaseous phase.

An opening 16 is formed on the lid of each cell 2 and sealingly seats a cap 17 which is connected in a removable manner. For this purpose, the cap may be provided with a seal and with fastening means such as a snap-engaging system involving elastic deformation of an annular lug provided, or a thread able to engage inside a matching counter-thread formed on the edge of the opening 16, or also other equivalent solutions.

Each cap 17 is provided with an inlet pipe 18 and an outlet pipe 19 which are connected to the electrolytic distribution circuit before start-up of the plant 1 as described hereinbelow.

The inlet pipe 18 of the cap 17 of each cell 2 is connected by means of a first connecting line 10 to the first distribution header 9 so as to supply the corresponding cells 2 with the first flow of electrolytic solution, while the outlet pipe 19 is connected via a second connecting line 13 to the suction header 12 so as to extract the first flow of electrolytic solution from the said cells 2, i.e. that flow which entered into the containers of the cells 2 via the inlet pipe 18.

According to the underlying idea of the present invention, each cap also comprises at least one ventilation pipe 20 which connects the internal environment of the corresponding cell 2, present underneath the lid 2", to the external environment which is at atmospheric pressure, so as to dilute the formation of inflammable gases inside the said cell 2.

In greater detail, the ventilation pipe connects via a third connecting line 22 the cap 17 to the top of the first distribution header 9 (distribution tank) which is under atmospheric pressure.

This ventilation pipe 20 favors the entry of air from the external environment, said air diluting the concentration of the inflammable gases which are formed inside the cell 2.

The ventilation pipe 20 balances the pressure inside the cells 2 with the external atmospheric pressure, preventing the formation of a vacuum inside the cells 2 or preventing the head of the first distribution header 9 from creating an overpressure inside the cells 2 which could deform the casing thereof.

It should be noted that, in the case of a malfunction of the plant section which draws off the electrolyte, i.e. if the suction header 12 no longer draws off the electrolyte from the outlet pipe 19, the electrolyte descending from the first distribution header 9 through the inlet pipe 18 may find a way out of the cells 2 along the ventilation pipe 20. Since the latter is connected to the top part of the first distribution header 9, the said ventilation pipe 20 closes off the flow of electrolyte owing to the greater head of the electrolyte column which forms inside the ventilation pipe 20 compared to the level of electrolyte inside the first distribution header 9.

The first distribution header 9 is supplied by the delivery line 8 via a first connecting pipe 23 along which a first valve 24 is connected.

During filling of the containers, the valve 24 is opened so as to supply the cells 2 with the flow of electrolyte.

The first distribution header 9 is provided with a first piezometric line 27 which ensures a constant and controlled head along the inlet pipes 18 of the caps 17 so as to control the first flow supplying the cells with electrolytic solution. For this purpose the valve 24 may be of the modulating type for controlling precisely the flow from the delivery line 8 to the first distribution header 9.

The first flow which passes through the individual cells 2 has a fairly low flowrate in order to allow charging inside the cells 2 by promoting the correct electrochemical reactions on the plates.

The drawing off of the electrolytic solution through the outlet pipes 19 of the caps 17 on the cells 2 must be balanced by the introduction of the first flow of electrolytic solution through the inlet pipes 18 so as to draw off the same quantity which is introduced, or slightly more, without ever drawing off an excessive quantity of air and without consequently having to overdimension excessively the electric fan 14.

Drawing off through the outlet pipes 19 is therefore substantially preset for a flowrate which is slightly greater than the average flowrate of the first flow of electrolytic solution so that, even when the bottom ends of the outlet pipes 19 are situated slightly above the free surface of the electrolytic solution, the air flow sucked in by the electric fan 14 through the second connecting line 13 as well as through the suction header 12 is reasonably limited by the predefined cross-section of the said outlet pipes 19.

Advantageously, in accordance with the embodiments shown in FIGS. 2 to 5, the supply means 6 comprise a second distribution header 21 which is able to be connected by means of the third connecting lines 22 to the ventilation pipe 20 in the caps 17 so as to supply the said cells 2 during initial filling with a second flow of electrolytic solution greater than that of the first flow.

Figure 2:
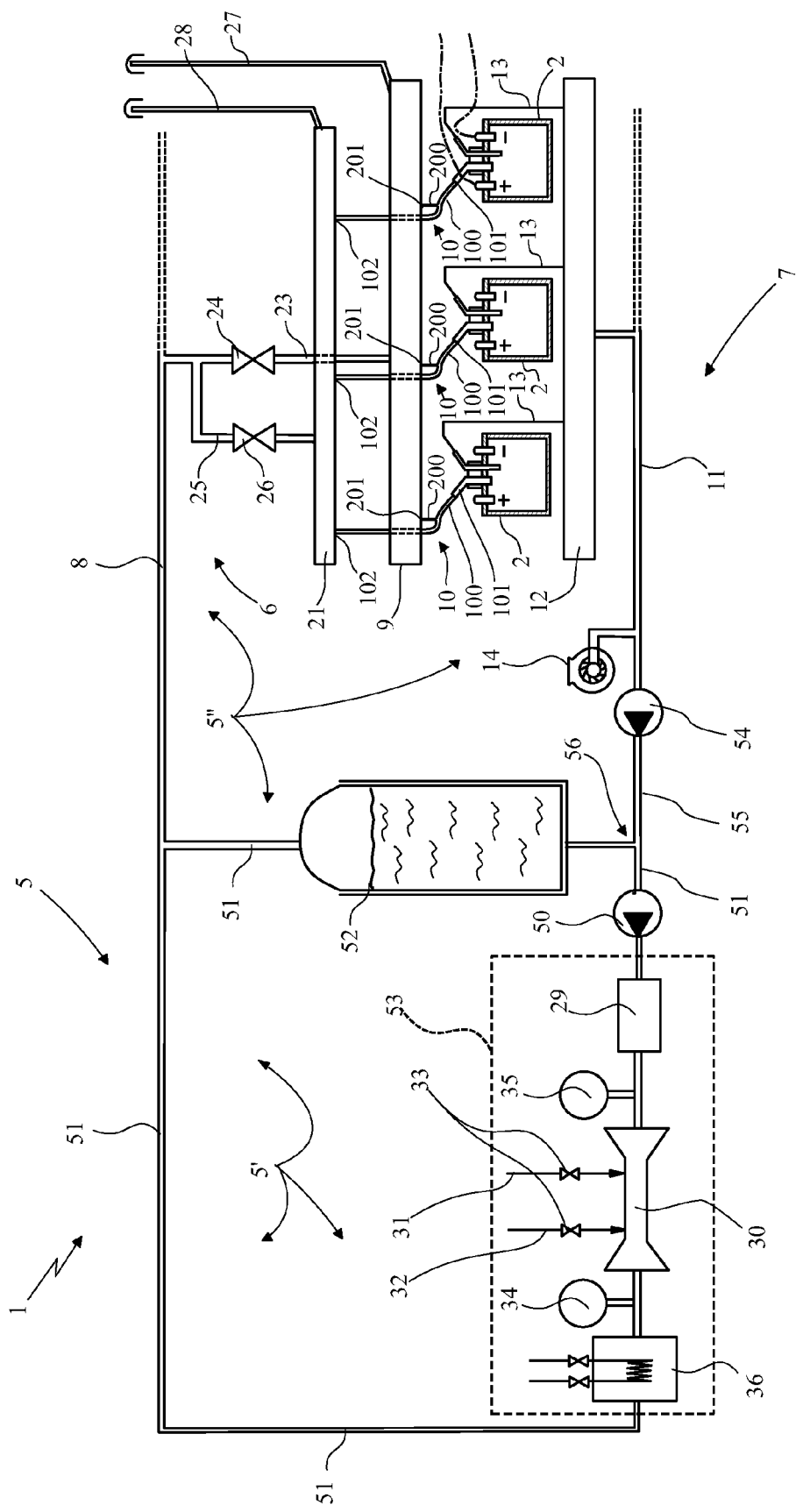
FIG. 2 shows a diagram of a second example of a plant for the electrochemical formation of lead-acid batteries, according to the present invention.
Figure 3A:
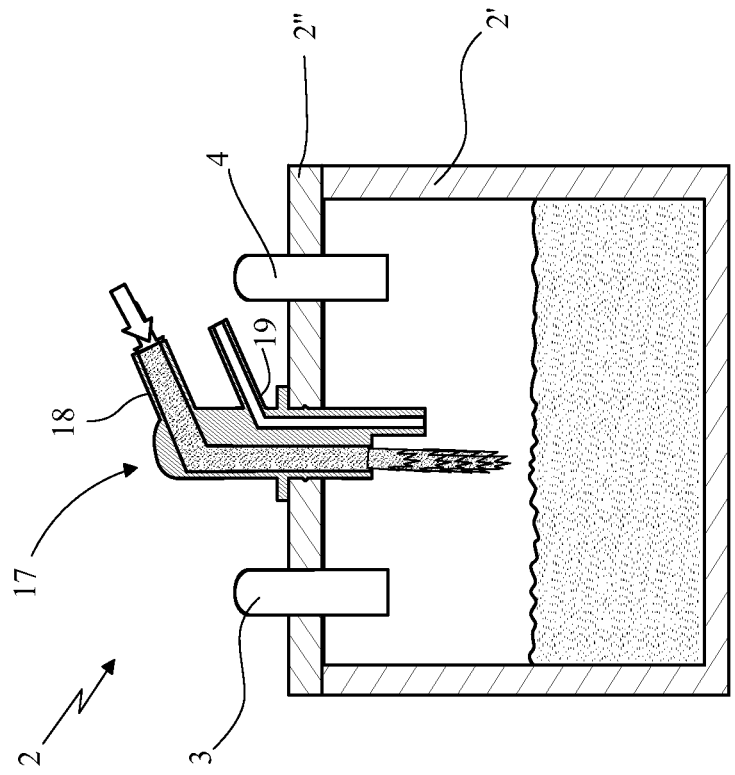
FIGS. 3A and 3B show a detail of the plant according to FIG. 2, relating to a cap mounted on a battery cell in two different operating conditions.
Figure 3B:
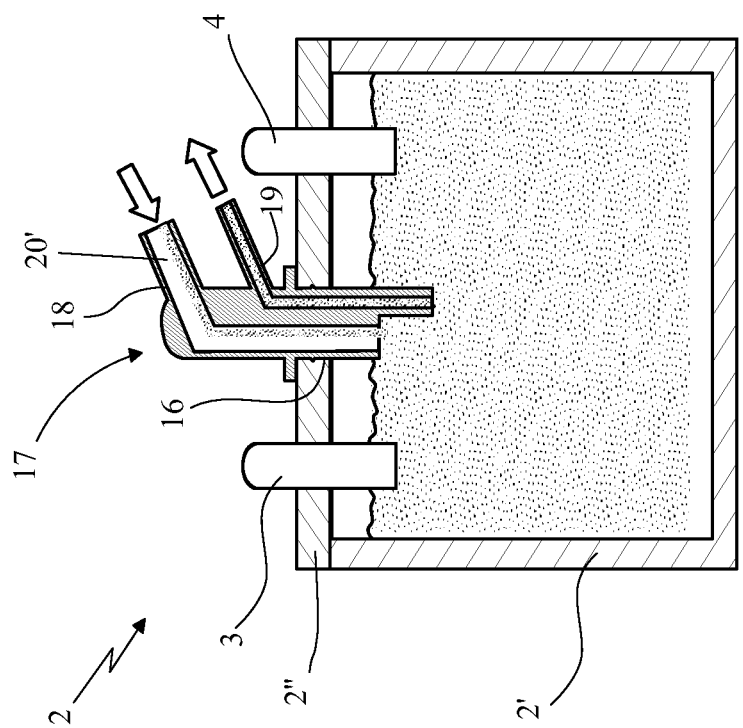

In greater detail, according to the embodiment of the present invention shown in FIGS. 2 and 3, the aforementioned first connecting line 10 is formed by a main section 100 and by a branched section 200.

The main section 100 has a first end 101 connected to the inlet pipe 18 of the corresponding cell 2 and a second end 102 connected to a second distribution header 21.

The main section 100 of the first connecting line 10 also acts at the same time as a third connecting line 22, while the portion 20' of the inlet pipe 18 acts as a ventilation pipe 20.

The branched section 200, which extends from the main section 100 forming with it for example a T connection, has a third end 201 which is connected to the first distribution header 9 so as to introduce into the cell 2 the first flow of electrolytic solution.

The quantity of electrolytic solution to be recycled into the cells 2 of the batteries, referred to above as first flow, must be controlled, generally by means of a modulating valve (referred to below as first valve 24), so as to promote the correct chemical reactions inside the cells 2. The abovementioned quantity of electrolytic solution which passes through the cells is varied automatically so as to keep the temperature substantially constant and typically between 45° and 55° C., in order to avoid dangerous overheating of the material deposited on the plates of the cells 2. Further variations in the first flow of electrolytic solution may also be subject to replenishment with water or sulfuric acid, as will be described below.

The second distribution header 21 is able to supply the cells 2 with a second flow of electrolytic solution by means of the aforementioned main section 100 of the first connecting line 10, preferably only during initial filling of the cells 2.

In greater detail, the second distribution header 21 is supplied by means of a second connection pipe 25 which has, connected along it, a second valve 26 able to assume at least one open position, where it supplies and fills the cells by means of the second flow, in particular during an initial stage of electrochemical formation of said batteries, and at least one closed position, where it connects the cells with the atmospheric pressure during normal filling of the cells 2.

During filling, the first flow of electrolytic solution which must be recycled through the cells is drawn off from the first distribution header 9 by means of the branched section 200 of the first header which then leads into the main section 100 and down into the cells 2 through the inlet pipe 18. The first flow which passes through the individual cells 2 therefore has, as mentioned, a fairly low flowrate in order to allow charging inside the cells 2 by promoting the correct electrochemical reactions on the plates.

The first distribution header 9 is provided with a first piezometric line 27 which ensures a constant and controlled head along the inlet pipes 18 of the caps 17 so as to control the first flow supplying the cells with electrolytic solution. For this purpose the valve 24 may be, as mentioned, of the modulating type for controlling precisely the flow from the delivery line 8 to the first distribution header 9.

During battery charging and formation, the second valve 26 is in the closed position such that the main section 100 of the first connecting line 10 keeps the chamber defined by the rigid container 2' of the cell at atmospheric pressure.

For this purpose, the main section 100 has a greater cross-section than the branched section 200 so that the first flow of electrolytic solution affects only a minimum part of the cross-section of the main section 100 and the chamber of the cell 2, during normal charging (following initial filling of the batteries), is kept constantly at atmospheric pressure owing to the connection by means of the aforementioned main section 100, the second distribution header 21 and a second piezometric line 28 connected to the second distribution header 21.

The main section 100 may convey the second flow of electrolytic solution at a rate which is considerably greater than that of the first flow. The flowrate of the second flow of electrolytic solution is conveniently greater than that of the first flow since it is intended, initially, to fill quickly the cells, while the flowrate of the first flow is determined simply by the continuous topping up which is required to optimize the formation process and maintain the optimum temperature and concentration characteristics of the electrolytic solution.

The second distribution header 21 is situated above the first header 9 and is provided with the aforementioned second piezometric line 28 able to ensure the second flow for supplying the cells with electrolytic solution for as long as the second valve 26 is open or during initial filling of the cells 2. When this stage has been completed and once the second valve 26 is closed, the second distribution header 21 discharges into the cells 2 the electrolytic solution accumulated so as to free completely the main sections 100 of the first connecting lines 10 which will then convey the atmospheric pressure inside the cells 2 for the continuation of the charging process.

During this initial container filling stage, both the valves 24 and 26 may be open in order to supply in parallel the container, allowing more rapid filling thereof.

The branched section 200 of the first connecting line 10 is designed with dimensions such as to convey into the section branch and therefore into the cell 2 only the quantity of the first flow of electrolytic solution. For this purpose, it has suitably predefined dimensions, for example with an adjustable constriction at the outlet from the first distribution header 9, so as to recycle into the cell 2 in a precise manner the first flow of electrolytic solution necessary for optimization of the charging process.

Drawing off through the outlet pipes 19 is, as mentioned, substantially preset for a flowrate which is slightly greater than the average flowrate of the first flow of electrolytic solution.

Therefore, the inlet pipe 18 of the cap 17 has a cross-section much greater than that of the outlet pipe 19.

The main section 100 of the first connecting line 10 mentioned above performs two different functions, i.e. a supplying function, where it conveys a second flow of electrolytic solution into the cell 2 during initial filling, in particular coinciding with the start of the electrochemical formation process, and a degassing operation, which takes place for the entire subsequent duration of the formation process, where the same main section 100 connects, together with the second header 21 and the line 28, the upper volume of the cell 2, which is situated above the free surface of the electrolytic solution and where inflammable gases may accumulate, to the external environment, thereby placing the interior of the cell 2 under atmospheric pressure.

Advantageously, the cap 17 may also be provided with a seat (not shown) for a temperature probe which is able to measure the temperature at the outlet pipe 19.

The end, inside the cell 2, of the inlet pipe 18 extends down to a height lower than that which is reached by the inner end of the outlet pipe 19, as can be seen in the accompanying figures.

Figure 4:
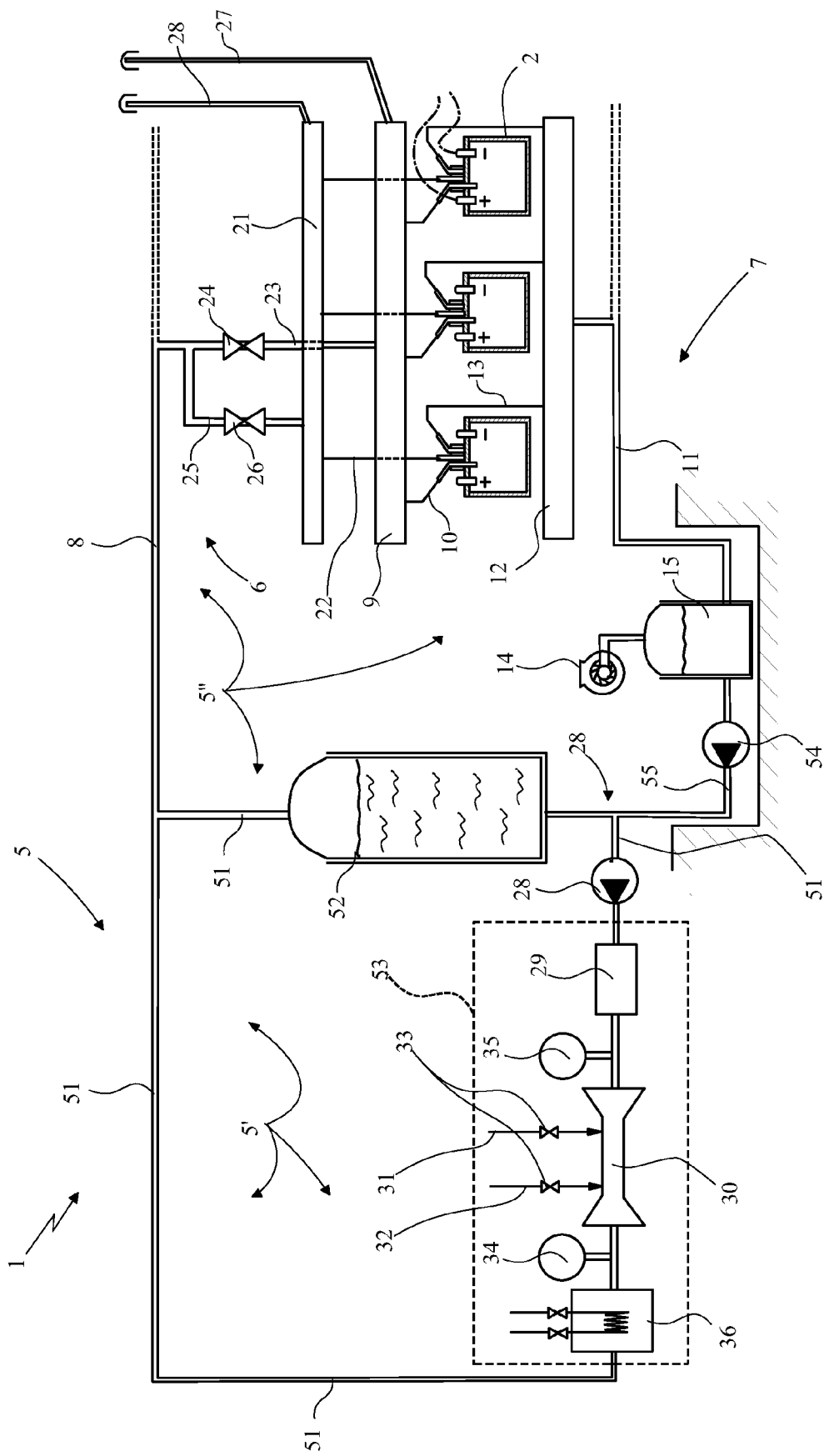
FIG. 4 shows a diagram of a third example of a plant for the electrochemical formation of lead-acid batteries, according to the present invention.
Figures 5A, 5B:
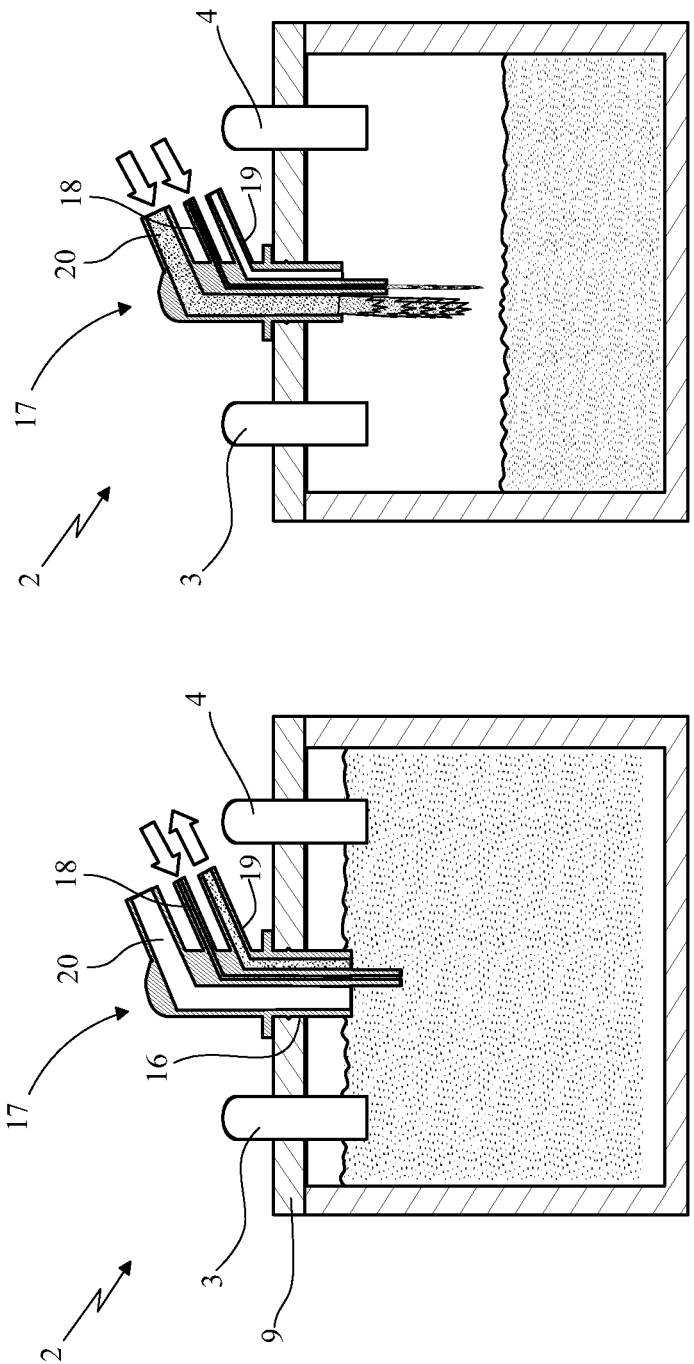
FIGS. 5A and 5B show a detail of the plant according to FIG. 4, relating to a cap mounted on a battery cell in two different operating conditions.

In accordance with the embodiment shown in FIGS. 3 and 4, each cap is provided with three separate pipes, i.e. an inlet pipe 18, an outlet pipe 19 and a ventilation pipe 20. These pipes are connected, prior to start-up of the plant 1, as described hereinbelow. The inlet pipe 18 is connected to an end of one of the first connecting lines 10 which is connected at its other end to the first distribution header 9 so as to supply the cell 2 on which the cap 17 is mounted with the first flow of electrolytic solution.

The outlet pipe 19 is connected to an end of one of the second connecting lines 13 which is connected at its other end to the suction header 12 so as to extract from the cell 2 the first flow of electrolytic solution (FIG. 2A) which has entered into the container of the cell 2 via the inlet pipe 18.

In this case also, drawing off through the outlet pipes 19 is, as mentioned, substantially preset for a flowrate which is slightly greater than the average flowrate of the first flow of electrolytic solution.

In this case also, the abovementioned ventilation pipe 20 performs two different functions, i.e. a supplying function, where it conveys the electrolytic solution into the cell 2 during initial filling, in particular coinciding with the start of the electrochemical formation process, and a degassing operation, which takes place for the entire subsequent duration of the formation process, where the same ventilation pipe 20 connects the upper volume of the cell 2, which is situated above the free surface of the electrolytic solution and where inflammable gases may accumulate, to the external environment, thereby placing the interior of the cell under atmospheric pressure.

In accordance with all the embodiments shown in the accompanying figures, the electrolytic solution received by the suction header 12 reaches, as a result of the vacuum created by the electric fan 14, the receiving line 11 (or in certain cases a separator tank which advantageously may be arranged also underground).

The circuit 5 of the electrolytic solution is composed preferably of a main circuit 5', inside which a main flow significantly greater than the flow which is supplied from the line 11 for receiving the first flows for the cells 2 is circulated by means of a pump 50, and a secondary circuit 5", which via the delivery line 8 draws off from the main circuit 5' only the flow required for the cells 2 and then reintroduces it into the same main circuit 5' after collecting it at the outlet of the cells 2, via the receiving line 11.

The main circuit 5' comprises a third pipe 51 having, extending from it, the delivery line 8 along which a storage tank 52 for the electrolytic solution and temperature and concentration control means denoted overall by 53 are connected. The flow of electrolytic solution from all the cells 2, collected inside the separator tank 15, is then conveyed by means of a second pump 54 and via a fourth pipe 55 into the main circuit 5', preferably at an intersection 56 which is situated immediately upstream of the first pump 50.

The pump 54 has on its delivery side a head which is greater than that present in the main circuit 5' at the intersection 56 so as to allow the flow of electrolytic solution of the secondary circuit 5" to be introduced into the main circuit 5'.

This electrolytic solution supplied from the cells 2 has a temperature which is higher than that of the electrolytic solution with which the cells 2 were previously supplied via the first distribution header 9. The concentration of electrolyte in the solution varies during the electrochemical reactions which occur during the charging process. Since, however, the plant 1 treats simultaneously several cells 2 which are organized in different charging stations operating at different times and with different charging cycles, the concentration of the electrolyte in the secondary circuit 5" may be partly compensated for. Moreover, during the very initial charging phase, when the acid is introduced into the cells 2, there is dilution of the electrolytic solution with a reduction in the concentration of the electrolyte, which concentration instead increases during the subsequent electrochemical formation stage. Therefore, the flow of solution collected inside the receiving line 11 must be cooled and generally requires only small adjustments of the concentration.

The control means 53 mentioned above comprise advantageously a filtering unit 29, which filters out any impurities which may have been picked up by the flows of electrolytic solution inside the individual cells 2 during charging.

An adding mixer 30 for continuously adjusting the density of the electrolytic solution is arranged downstream of the filtering unit 29. The abovementioned adding mixer 30 has, flowing into it, a water supply line 31 and sulfuric acid supply line 32 which are both subject to respective control means 33. The latter preferably consist of modulating valves which allow the introduction of predefined amounts of fluid depending on opening of the said valve.

Two devices for detecting the concentration of electrolyte in the solution, denoted by 34 and 35 respectively, are provided upstream and downstream of the adding mixer 30.

Depending on the concentration detected by them, water and/or electrolyte (sulfuric acid) are added by the adding mixer 30 within the electrolytic solution.

Since, in fact, the flow which circulates inside the main circuit 5' is constant, and knowing via the detection devices 34 and 35 the concentration of electrolyte in the solution, it is possible, by means of the adding mixer 30, to control precisely the concentration of the solution.

Downstream of the adding mixer 30 there is a cooling unit 36 for cooling the electrolytic solution.

The invention thus conceived therefore achieves the predefined objects.

The invention claimed is:

1. Improved plant for the electrochemical formation of lead-acid batteries, of the type each provided with a rigid container closed at the top by a lid and containing at least one voltaic cell, said plant comprising:
   at least one circuit inside which an electrolytic solution flows and which is provided with supply means for conveying into the cells of said batteries, by at least one first distribution header, a first flow of electrolytic solution at a controlled pressure, and with return means for removing under a vacuum, by at least one suction header, said first flow of electrolytic solution from said cells;
   a plurality of caps which can be removably mounted in a sealed manner on the lids of said batteries opposite corresponding cells, each cap comprising:

at least one inlet pipe connected via a first connecting line to said first distribution header (9) for supplying a corresponding said cell with said flow of electrolytic solution;

at least one outlet pipe (19) connected via a second connecting line (13) to the suction header (12) for extracting from said cell said first flow of electrolytic solution;

wherein each said cap also comprises fluidic connection means (20, 20') which connects the internal environment of the cell, present underneath the lid, to the external environment which is at atmospheric pressure, so as to dilute the formation of inflammable gases inside said cell;

wherein said fluidic connection means of each said cap connects via a third connecting line the internal environment of a cell to a second distribution header of said supply means which supply, by said second distribution header, during initial filling of the plant, said cells with a second flow of electrolytic solution greater than the first flow of electrolytic solution.

2. Improved plant for the electrochemical formation of lead-acid batteries according to claim 1, wherein said first connecting line comprises:

at least one main section, which acts as said third connecting line and has a first end connected to the inlet pipe of said cell, and a second end connected to a second distribution header of said supply means;

a branched section, which extends from said main branch and has a third end which is connected to the said first distribution header so as to introduce into said cell said first flow of electrolytic solution;

said fluidic connection means comprising a longitudinal portion (20') of said inlet pipe (18), which longitudinal portion (20') remains clear while said first flow of electrolytic solution flows through said inlet pipe (18), and said supply means being able to supply, by said second distribution header and by said main section, said cells with a second flow of electrolytic solution.

3. Improved plant for the electrochemical formation of lead-acid batteries according to claim 2, wherein said main section has a cross-section greater than that of said branched section.

4. Improved plant for the electrochemical formation of lead-acid batteries according to claim 3, wherein the inlet pipe of said cap has a cross-section which is greater than the outlet pipe of said cap.

5. Improved plant for the electrochemical formation of lead-acid batteries according to claim 2, wherein the branched section of said first connecting line is designed with dimensions substantially so as to convey, along said main section and therefore into said cell, the quantity of said first flow of electrolytic solution.

6. Improved plant for the electrochemical formation of lead-acid batteries according to claim 1, wherein the outlet pipe of said cap is designed with dimensions substantially so as to draw off the quantity of said first flow of electrolytic solution.

7. Improved plant for the electrochemical formation of lead-acid batteries according to claim 1, where said second distribution header is supplied by a second connection pipe which has, connected along it, a second valve able to be displaced between at least one open position, where it supplies said cells by said second flow, during filling thereof and at least one closed position, where it connects said cells to the atmospheric pressure.

8. Improved plant for the electrochemical formation of lead-acid batteries according to claim 1, wherein said first distribution header and said second distribution header extend parallel to each other with an elongated tubular form.

9. Improved plant for the electrochemical formation of lead-acid batteries according to claim 1, wherein said suction header has an elongated tubular form directed parallel to that of the two distribution headers.

10. Improved plant for the electrochemical formation of lead-acid batteries according to claim 1, wherein said fluidic connection means comprises at least one ventilation pipe (20).

11. Improved plant for electrochemical formation of lead-acid batteries according to claim 10, wherein said ventilation pipe (20) performs two different functions comprising (i) a supplying function where said ventilation pipe conveys the electrolytic solution into the cell (2) during initial filling, and (ii) a degassing operation which takes place for the entire subsequent duration of the formation process, wherein the same ventilation pipe (20) connects the upper volume of the cell (2) to the external environment, thereby placing the interior of the cell under atmospheric pressure.

12. Improved plant for the electrochemical formation of lead-acid batteries according to claim 10, wherein the ventilation pipe (20) of said cap (17) has a diameter greater than the inlet pipe (18) of said cap (17), whereby the diameter of the ventilation pipe of said cap is 1.5 to 15 times greater than the diameter of the inlet pipe (18) of said cap (17).

* * * * *